Jan. 18, 1949. R. W. ENGSTROM 2,459,632
COMPARISON CONTROL SYSTEM
Filed Dec. 26, 1947
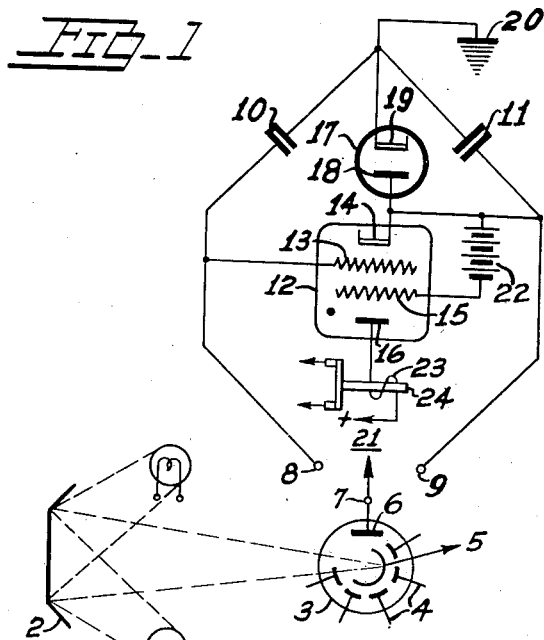
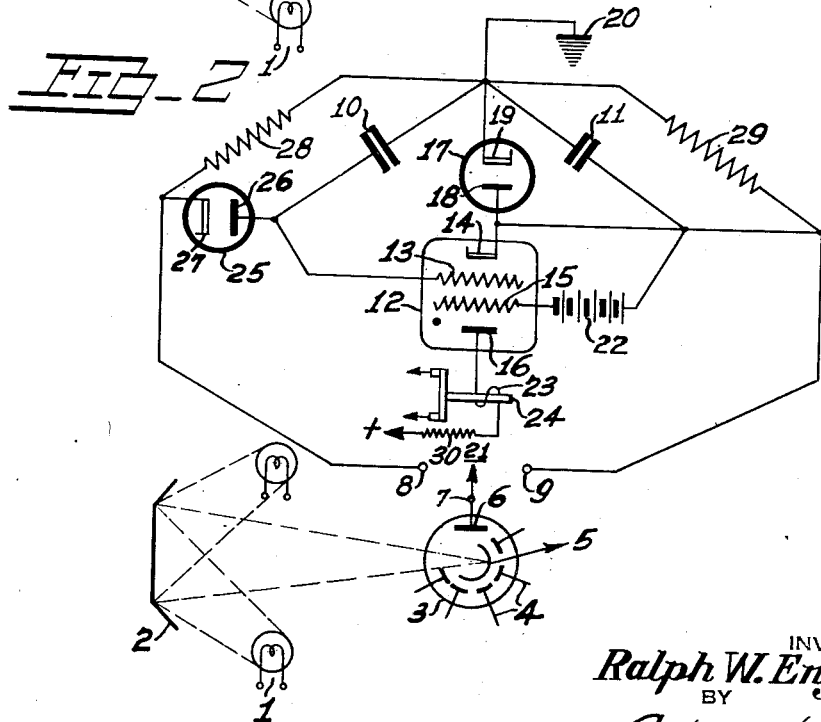
INVENTOR
Ralph W. Engstrom
BY
Conder C. Henry
ATTORNEY Patented Jan. 18, 1949

2,459,632

UNITED STATES PATENT OFFICE 2,459,632

COMPARISON CONTROL SYSTEM

Ralph W. Engstrom, East Petersburg, Pa., assignor to Radio Corporation of America, a corporation of Delaware Application December 26, 1947, Serial No. 794,006

14 Claims. (Cl. 250—41.5)

My invention relates to improvements in energy comparators and more particularly to a circuit for comparing a plurality of energy sources to a standard source for purposes of control.

It is known in the prior art that energy differences may be measured or may be used to control various switching operations by means of energy translating devices. There are at least three general classifications of such energy-control equipment: Static controls which function under conditions of full exposure or no exposure; dynamic controls which are responsive to changes in degree only; and arrangements which are used for comparison purposes, it being necessary to take special precautions in the latter class to insure measuring accuracy. My invention relates more particularly to devices within the last class.

Certain types of prior art apparatus utilize either a plurality of energy translating devices in a balanced circuit for establishing a center scale reading of a meter, or apply a balanced circuit to only one of such devices and utilize equalizing currents as manifestations of deviations determined by comparison. Other types utilize a known quantity of energy to charge or to delay the discharge of a condenser through an energy translating device acting as a switch, presupposing a predetermined knowledge of the controlling quantity of energy and also being dependent upon the sensitivity of the energy translating device.

It is known that the sensitivity of most of the usual energy translating devices is variable with time. This fact is particularly troublesome in those arrangements mentioned which depend on the sensitivity of the device for their operation. A further difficulty experienced in prior art arrangements is the lack of certainty in operation due to the relatively weak currents furnished by the usual translating device of the light sensitive type unless coupled to an amplifying system.

Accordingly, it is an object of my invention to provide a circuit means of utilizing an energy translating device in such manner that the circuit acts as a comparator between a standard pulse of energy and an unknown pulse of energy independent of the sensitivity of the energy translating device.

Another object of my invention is to provide a circuit means of utilizing an energy translating device in such manner that the circuit acts as a comparator between a steady standard source of energy and an unknown source of energy independent of the sensitivity of the energy translating device.

Still another object of my invention is to provide a circuit means characterized by two or more electrical storage devices which are, one after another, connected to the same energy translating device, receiving from its action a change of their stored energies while said device is correspondingly under the influence of a different one of several sources of energy to be compared with each other.

A further object of my invention is to provide circuit means for utilizing a comparison of charge conditions derived from a comparison of any energy source with a standard energy source to control the operation of an electro-responsive device.

A still further object of my invention is to provide an energy translating device for furnishing strong currents to charge condensers for comparison of such charge conditions to terminate the exposure or to control any switching operation.

In accordance with one embodiment of my invention a circuit is provided which utilizes a plurality of capacitors arranged to be sequentially connected to an energy translating device and which receive from the action of such device a change of their charge condition while the energy translating device is correspondingly under the influence of a different one of several sources of energy for comparison of such charge conditions. A qualitative comparison is made when the condensers, which are connected to an electro-responsive device, attain the desired charge conditions to initiate the operation of the electro-responsive device.

For a better understanding of my invention and only by way of illustration, together with other and further objects and advantages thereof, reference is made to the following description taken in connection with the accompanying drawings, in which:

Figure 1 represents a schematic diagram of one embodiment of my invention for comparing an unknown light pulse to a standard light pulse.

Figure 2 is a schematic diagram of another embodiment of my invention for comparing an unknown light source to a steady standard light source.

Referring to Figure 1 of the drawings, several different light sources 1, are arranged with a suitable focusing means 2, so that the resultant light will be directed on the photo-emissive cathode 5 of a suitable photo-multiplier tube 3. It will be understood that this photo-multiplier tube is merely one type of photo-sensitive device, and that my invention is not restricted to the use of such a tube, since any of the various well known types of vacuum or gas-filled cells with a suitable amplifier system could be employed.

The preferred type photo-sensitive device may be any type of electrostatically focused photo-multiplier tube 3, comprising a plurality of multiplier elements known as "dynodes" 4, a photo-emissive cathode 5, and an anode 6, and suitably connected to a power supply, not forming part of this invention and not shown, whereby a graduated voltage impressed across the tube elements will result in multiplication of the anode or output current.

The anode 6, of the photo-multiplier tube is connected to a switching arrangement 21, which may be any type of selector that would produce the desired result when used with my system. In accordance with the embodiment of my invention shown in Figure 1, I prefer to use the single-pole, double-throw switch 21, having pole members 8 and 9, and a switch arm 7, connected to the anode 6, of the photo-multiplier tube.

The pole members are connected to a comparison circuit comprising a symmetrical arrangement of condensers 10 and 11, coupled to an electro-responsive circuit using a thyratron 12, the operating level of which is established by the charge conditions of the condensers.

The pole member 8, is connected to one side of a condenser 10, and the pole member 9, is connected to one side of a second condenser 11, so that the switch arm 7, may connect either of the condensers 10 and 11, to the anode 6, of the photo-multiplier tube 3, in order to receive from its action a quantity of charge which is equivalent to the quantity of light to which the said photo-multiplier tube is being subjected. The condensers 10 and 11, need not be equal in capacity and may vary in size depending on the application and desired result. The other sides of the condensers are mutually connected to a point of fixed reference potential 20.

In the relay control circuit which is coupled to the above described symmetrical condenser arrangement, I prefer to use an inert gas-filled thyratron 12, having a hot cathode 14, which may be indirectly heated by a suitable filament (not shown), a control grid 13, a shield grid 15, and an anode 16. The control grid 13, is connected to the mutual connection of the condenser 10, and the switch pole member 8, so that the charge condition of the condenser 10, which was derived from the current flow resulting from the exposure of the photo-multiplier tube to a standard light source, will impose a bias voltage on the control grid thus establishing one of the conditions of the operating level for the thyratron.

Another condition incident to establishing the aforementioned operating level is provided for by connecting the shield grid 15, to the negative pole of a biasing battery 22, whose positive pole is connected to the mutual connection of the condenser 11, and the switch pole member 9. A third condition in establishing the thyratron operating level is provided for by connecting the cathode 14, to the mutual connection of battery 22, condenser 11, and pole member 9. Finally, the thyratron anode 16, is shown returning through relay operating coil 23, to a suitable power supply, not forming part of this invention and not shown, to further fix the desired operating level whereby equal charge conditions on the condensers 10 and 11, will initiate a firing of the thyratron, and the equivalent of the comparison of the unknown to the standard light source will manifest itself in the form of some switching operation.

In order to complete the thyratron control circuit so that current may flow through the thyratron after firing and yet prevent the condensers 10 and 11, from discharging before firing, the cathode 14, is connected through a rectifier 17, to the mutual connection of the condensers 10 and 11, at the fixed reference point 20. Although other types of rectifiers may be used, I prefer to use a diode 17. The cathode 14, of the thyratron is connected to the anode 18, of said diode, and the cathode 19, of the diode completes the thyratron circuit to the reference point 20.

The described arrangement operates in the following manner: With the switch arm 7, of switch 21, connected to the pole member 8, a standard light pulse is flashed from a light source at 1 to illuminate the cathode 5, of the photo-multiplier tube 3. Illumination of the cathode releases electrons which are directed by positive electric fields to the first dynode where they cause secondary emission which adds to the original electron stream. In this way, the signal is multiplied until it reaches the collector anode 6, which is coupled to the side of the symmetrical arrangement of the condensers 10 and 11, which is connected to the pole member 8, of switch 21. The current output of the photo-multiplier tube flows through the condenser 10, to ground thereby charging said condenser and impressing a negative voltage on the control grid 13, of the thyratron, which voltage is equivalent to the quantity of the standard light reaching the cathode of the photo-multiplier tube and which serves to fix one of the parameters for establishing the desired operating level for the thyratron.

The switch arm 7, of switch 21, is then connected to pole member 9, and light from some unknown light source as 1 is allowed to illuminate the photo-multiplier tube cathode. The method of alternately allowing the standard and unknown light sources to illuminate the photo-multiplier tube cathode is not a part of this invention, and any suitable means known to the art may be used. The last mentioned illumination manifests itself in the form of an electric current, in the same manner as indicated for the standard light with the exception that the condenser 11, is charged and impresses a negative voltage on the cathode 14, of the thyratron which again is equivalent to the quantity of the unknown light reaching the cathode of the photo-multiplier tube and which serves to fix another parameter for establishing the desired operating level for the thyratron. A third control parameter is established by the shield grid 15, and associated biasing battery 22. Proper selection of a voltage for the thyratron anode 16, from a suitable power supply will fix the boundary conditions at the desired operating level.

In the preferred embodiment of my invention, the operating level established by the above-mentioned parameters has been so chosen, that when the voltage impressed on the control grid 13, by the charge on condenser 10, which is derived from the action of the standard light reaching the photo-multiplier tube, is equal to the voltage impressed on the cathode 14, by the charge on condenser 11, which is likewise derived from the action of the unknown light reaching the photo-multiplier tube, the thyratron will fire and current will through the coil 23, of a relay to actuate an armature 24, for closing or opening the relay. The firing of the thyratron is independent of the sensitivity of the photo-multiplier tube for all practical purposes; since such firing depends only on a comparison of energy quantities stored in condensers 10 and 11, which are derived from the quantity of light illuminating the photo-multiplier tube cathode regardless of time. Therefore, any variations of sensitivity with age, or tube changes, will have no effect on the comparison, and in the above-illustrated embodiment of my invention, like quantities of energy will fire the thyratron.

The net result is to compare the light energy of the standard light pulse to that of the relay terminated unknown light pulse independently of the sensitivity of the photo-multiplier tube without amplifying its output and to perform suitable switching operations without the necessity of previously determining the desired quantity of a controlling light source. This may be of particular interest in cases where the photo-multiplier sensitivity changes with age or where it is desired to interchange the photo-multiplier tubes.

It will be obvious from the above description and operation that the switch 21, may be manually, mechanically, or electrically controlled and operated, or may be frequency modulated, to attain certain desired results. It may also be desirable, depending on the magnitude of the charge imparted to the two condensers during operation, to use a three-way switch with a third position for returning the condenser to the initial uncharged condition before each test. It will be obvious that although the preferred novel system illustrated in Fig. 1 and hereinbefore described is primarily adapted to be employed when it is desired to utilize a comparison of light pulses, it may also be adapted to comparison with a steady illumination standard as shown in Fig. 2.

The system shown in Fig. 2 and in which like numbers refer to like parts functions in essentially the same manner and is basically the same as the system illustrated in Fig. 1. The only difference between these two systems is the addition in Fig. 2 of resistances 28 and 29, and a diode 25, in the condenser arrangement illustrated by Fig. 1, so that the time constant represented by the product of the resistance 28, and capacity 10, ($R_{28}$ $C_{10}$) will be less than a reasonable time for the voltage drop $IR_{28}$ to be established where I is the anode current of the photo-multiplier tube when illuminated with the standard calibration light. This is presumed in general to be less than one second. A resistance 29, may also be added in the second charge circuit of the condenser 11, but this is not necessary and if added must be of such a value that the time constant $R_{29}$ $C_{11}$ will be greater than the time of the expected light pulse to be measured or controlled to permit linear charging of the condenser 11. Another resistance 30, may be added in the thyratron plate circuit to limit high currents after firing and its value will depend on the characteristics of the thyratron.

It will be obvious from the above description and operation that some means must be added in the branch comprising the resistance 28, and condenser 10, to prevent the discharge of condenser 10, before the comparison to the charge condition of condenser 11, can be made. Here again, other types of rectifiers or uni-directional current devices may be used, but I prefer to use the diode 25, whose anode 26, is connected to the mutual connection between the control grid 12, of the thyratron and condenser 10, and whose cathode 27, is connected to a mutual connection of the resistance 28, and pole member 8, of the switch 21.

In the above-described modified embodiment of my invention a steady illumination standard 1, is allowed to illuminate the cathode of the photo-multiplier tube whose action charges the condenser 10, across resistance 28, in essentially the same manner as described for Fig. 1, except that the value of resistance 28, is chosen so that the condenser will receive only the desired quantity of energy from the steady illumination standard. The rectifier 25, acts to prevent the discharge of condenser 10, through resistance 28, before condenser 11, attains an equal charge condition to fire the thyratron essentially as described for Fig. 1.

I have mentioned hereinabove the application of my invention generally to various switching operations and particularly in conjunction with a light sensitive device for comparing a plurality of light sources to control such switching operations. However, my invention may be applied to any operation that can be controlled by a comparison of energies or energy devices such as antennas, thermo-couples, etc. In fact, it may be applied to any type of apparatus incorporating a plurality of energy sources to be compared wherein the comparison in an interruption or modification of the exposure of one source as a result of its action on an energy sensitive means manifesting itself as the equivalent of its exposure in an electro-responsive comparison circuit.

While I have shown and described what I consider to be the preferred embodiment of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent is:

1. A comparison system comprising in combination a plurality of symmetrically arranged electrical storage devices, an energy translating device sequentially energizing each of said storage devices, and an electro-responsive device connected between said symmetrical arrangement of electrical storage devices.

2. In a comparison system, a network comprising in combination a plurality of branch circuits symmetrically connected about a point of fixed reference potential, an electrical storage device in each of said branch circuits, an energy translating device sequentially energizing each of said storage devices, and an electro-responsive device connected between said symmetrical arrangement of electrical storage devices.

3. In a comparison system, a network comprising in combination a plurality of branch circuits symmetrically connected about a point of fixed reference potential, a condenser in each of said branch circuits, an energy translating device sequentially energizing each of said condensers, and an electro-responsive device connected between said symmetrical arrangement of condensers.

4. In a comparison system, a network comprising in combination a plurality of symmetrically arranged electrical storage devices, a light sensitive device sequentially energizing each of said storage devices, and an electro-responsive device connected between said symmetrical arrangement of electrical storage devices.

5. In a comparison system, a network comprising in combination a plurality of symmetrically arranged electrical storage devices, a photo-multiplier tube sequentially energizing each of said storage devices, and an electro-responsive device connected between said symmetrical arrangement of electrical storage devices.

6. In a comparison system, a network comprising in combination a plurality of symmetrically arranged electrical storage devices, an energy translating device, a switch sequentially connecting said energy translating device to each of said storage devices, and an electro-responsive device connected between said symmetrical arrangement of electrical storage devices.

7. In a comparison system, a network comprising in combination a plurality of symmetrically arranged electrical storage devices, an energy translating device sequentially energizing each of said storage devices, and an electro-responsive device connected between said symmetrical arrangement of electrical storage devices thereby indicating a comparison of their stored energies independent of the sensitivity of said energy translating device.

8. In a comparison system, a network comprising in combination a plurality of symmetrically arranged electrical storage devices, an energy translating device sequentially energizing each of said storage devices, and an electron discharge device connected between said symmetrical arrangement of electrical storage devices.

9. In a comparison system, a network comprising in combination a plurality of symmetrically arranged electrical storage devices, an energy translating device sequentially energizing each of said storage devices, and a grid-controlled electron discharge device connected between said symmetrical arrangement of electrical storage devices.

10. A comparison system, comprising in combination a plurality of symmetrically arranged condensers, an energy translating device sequentially energizing each of said condensers, an electron discharge device provided with a plurality of electrodes, means applying the charge conditions of each of said condensers to different ones of said electrodes, and a biasing battery connected to another of said electrodes whereby equal charge conditions of said condensers will render said electron discharge device conductive.

11. A comparison system, comprising in combination a plurality of symmetrically arranged condensers, an energy translating device sequentially energizing each of said condensers, an electron discharge device provided with an anode, a cathode, a control grid, and a shield grid, means for applying the charge of one of said condensers to said control grid and the charge of the other of said condensers to said cathode and a biasing battery connecting said shield grid to said cathode, a rectifier connecting said cathode to a point of fixed reference potential, and a source of power connected to said anode.

12. A comparison system, comprising in combination a plurality of symmetrically arranged condensers, an energy translating device sequentially energizing each of said condensers, an electron discharge device provided with an anode, a cathode, a control grid, and a shield grid, means for applying the charge of one of said condensers to said cathode and a biasing battery connecting said shield grid to said cathode, a rectifier connecting said cathode to a point of fixed reference potential, a relay operating coil, and a source of power, said relay operating coil connecting the anode of said electron discharge device to said source of power.

13. In a comparison system, a network comprising in combination a plurality of branch circuits symmetrically connected about a point of fixed reference potential; a resistance, a rectifier, and a condenser in one of said branch circuits, and a second condenser in another of said branch circuits; an energy translating device sequentially charging each of said branch circuits, and an electro-responsive device connected between said symmetrical arrangement of condensers.

14. In a comparison system, a network comprising in combination a plurality of branch circuits symmetrically connected about a point of fixed reference potential; a resistance, a rectifier, and a condenser in one of said branch circuits, a second resistance and a second condenser in another one of said branch circuits; an energy translating device sequentially charging each of said condensers through said resistances, and an electro-responsive device connected between said symmetrical arrangement of condensers.

RALPH W. ENGSTROM.

REFERENCES CITED

The following references are of record in the file of this patent:

UNITED STATES PATENTS

| Number | Name | Date |
|---|---|---|
| 1,721,216 | Hardy et al. | July 16, 1929 |
| 1,812,764 | Story, Jr. | June 30, 1931 |
| 1,840,500 | Geffcken et al. | Jan. 12, 1932 |
| 1,877,279 | Dawson | Sept. 13, 1932 |
| 1,898,046 | Geffcken et al. | Feb. 21, 1933 |
| 2,037,925 | Rentschler | Apr. 21, 1936 |
| 2,069,505 | Roberts | Feb. 2, 1937 |
| 2,225,353 | Scheldorf | Dec. 17, 1940 |
| 2,417,023 | Sweet | Mar. 4, 1947 |